(12) United States Patent
Kim et al.

(10) Patent No.: US 7,103,630 B2
(45) Date of Patent: Sep. 5, 2006

(54) METHOD OF RECEIVING SELECTED MAIL AT INTERNET MAIL DEVICE

(75) Inventors: Young-hoon Kim, Gyeonggi-do (KR); Sang-yong Han, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 785 days.

(21) Appl. No.: 10/188,064

(22) Filed: Jul. 3, 2002

(65) Prior Publication Data

US 2003/0135568 A1    Jul. 17, 2003

(30) Foreign Application Priority Data

Jan. 11, 2002    (KR)    ................. 2002-1693

(51) Int. Cl.
G06F 15/173    (2006.01)
(52) U.S. Cl. .................................... 709/203
(58) Field of Classification Search ................ 709/203
See application file for complete search history.

(56) References Cited

U.S. PATENT DOCUMENTS 6,266,692 B1 *  7/2001  Greenstein .................. 709/206
6,421,709 B1 *  7/2002  McCormick et al. ....... 709/206
6,507,866 B1 *  1/2003  Barchi ........................ 709/207

FOREIGN PATENT DOCUMENTS

JP    11-065962    3/1999
KR    1020020004365    1/2002

OTHER PUBLICATIONS

Japanese Office Action, Application No. 2002-314356, mailed Nov. 1, 2005.

* cited by examiner

*Primary Examiner*—David Y. Eng
(74) *Attorney, Agent, or Firm*—Staas & Halsey LLP

(57) ABSTRACT

A method to selectively receive mail by an Internet mail apparatus includes receiving and storing mail header information of at least one mail. Mail header information is selected corresponding to a predetermined mail from the at least one mail. A mail transmission command is transmitted to an incoming mail server requesting transmission of the predetermined mail corresponding to the mail header information selected. The Internet mail apparatus, in response to the mail transmission command, receives the predetermined mail.

18 Claims, 2 Drawing Sheets

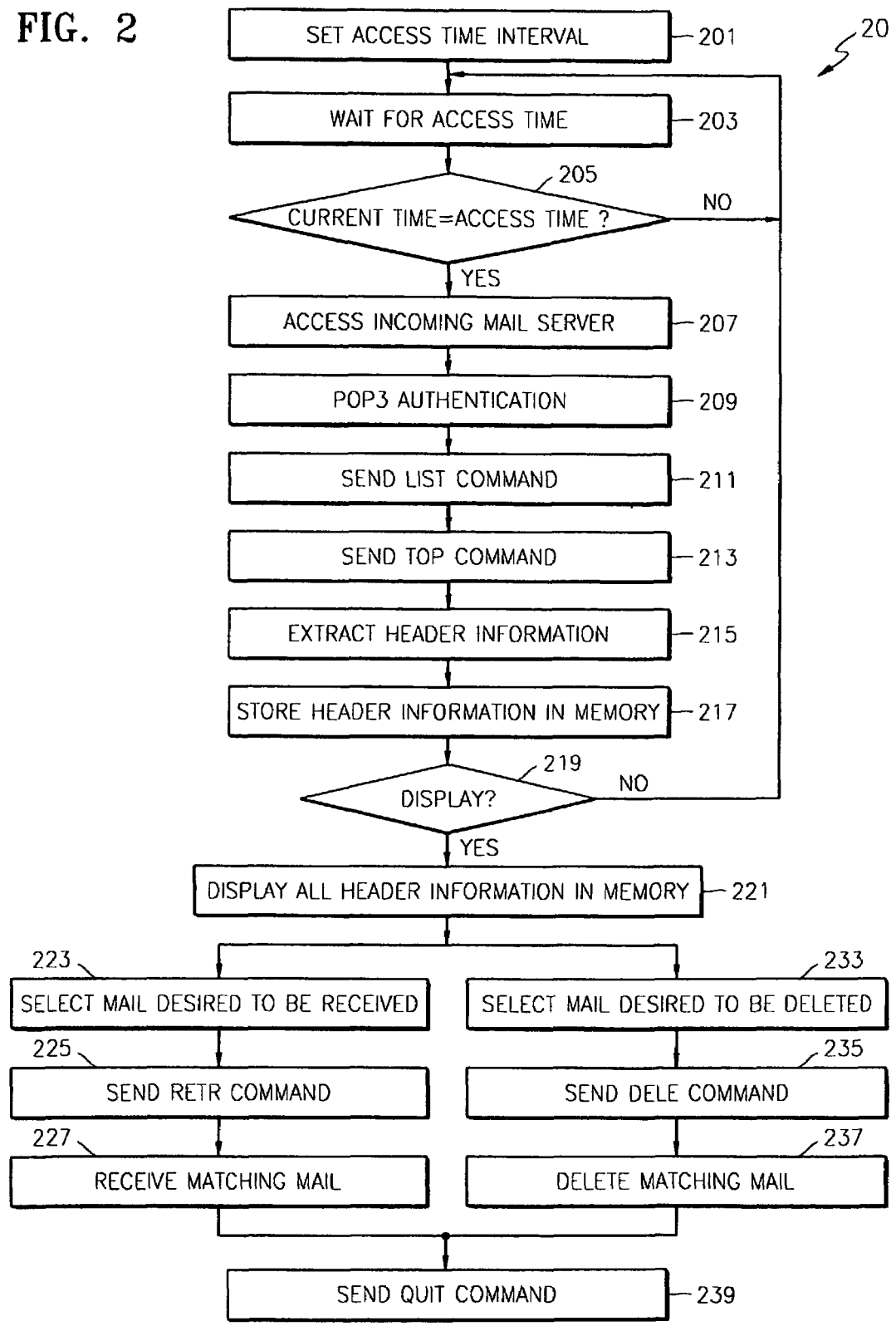

METHOD OF RECEIVING SELECTED MAIL AT INTERNET MAIL DEVICE

CROSS-REFERENCE TO RELATED APPLICATIONS

This application claims the benefit of Korean Application No. 2002-1693, filed Jan. 11, 2002, in the Korean Industrial Property Office, the disclosure of which is incorporated herein by reference.

BACKGROUND OF THE INVENTION

1. Field of the Invention

The present invention relates to a method to selectively receive electronic mail, and more particularly, to a method to selectively receive electronic mail by using only mail header information in an Internet mail apparatus, and a method to selectively transmit/delete electronic mail from an incoming mail server.

2. Description of the Related Art

An Internet mail apparatus is defined as a facsimile, a scanner, or a printer having a mail receiving function, excluding a Personal Computer (PC).

FIG. 1 is a block diagram of a general process of transmitting and receiving electronic mail. Referring to FIG. 1, in a mail transmitting and receiving block 10, which is well-known in the art, a sending party and a receiving party are linked to each other through the Internet.

The sending party includes an outgoing mail client (or a client program for sending electronic mail) 1 and an outgoing mail server 3. The outgoing mail client 1 transmits mail to the outgoing mail server 3 using a Simple Mail Transfer Protocol (SMTP).

The receiving party includes an incoming mail server 5 and an incoming mail client 7 (or a client program for receiving electronic mail). The incoming mail server 5 transmits mail to the mail client 7 using Post Office Protocol 3 (POP3).

The incoming mail client 7 periodically accesses the incoming mail server 5 and receives (or downloads) all mail or new mail from a mail box in the incoming mail server 5. In this case, the incoming mail client 7 also periodically receives spam mail.

Accordingly, as the incoming mail client 7 receives the spam mail which a user does not want to receive, a communications cost of the Internet mail apparatus which uses a Public Switched Telephone Network (PSTN) increases. Also, as the Internet mail apparatus having a print function to receive and print the spam mail, the printing cost increases.

SUMMARY OF THE INVENTION

Various objects and advantages of the invention will be set forth in part in the description that follows and, in part, will be obvious from the description, or may be learned by practice of the invention.

To solve the above and other problems, it is an object of the present invention to provide a method by which a user can selectively receive or delete mail in an Internet mail apparatus. It is another object of the present invention to provide a method in which an incoming mail server selectively transmits or deletes mail.

To accomplish the above and other objects of the present invention, there is provided a method to selectively receive mail by an Internet mail apparatus, including: receiving and storing mail header information of at least one mail; selecting mail header information corresponding to a predetermined mail from the at least one mail; transmitting a mail transmission command requesting transmission of the predetermined mail corresponding to the mail header information selected; and receiving the predetermined mail in response to the mail transmission command.

To accomplish the above and other objects of the present invention, there is provided a mail transmission method by an Internet mail apparatus from an incoming mail server, comprising: receiving a command requesting mail header information from the Internet mail apparatus; transmitting mail header information of at least one mail to the Internet mail apparatus in response to the command; and transmitting the at least one mail corresponding to the command to the Internet mail apparatus.

The command requesting mail header information is a TOP command of a POP3, and the mail transmission command is an RETR command of the POP3.

To accomplish the above and other objects of the present invention, there is provided a method to selectively delete a mail in an incoming mail server comprising: receiving a command requesting mail header information from an Internet mail apparatus; transmitting mail header information of at least one mail to the Internet mail apparatus in response to the command; and deleting the at least one mail corresponding to the command to the Internet mail apparatus.

The command requesting mail header information is a TOP command of a POP3, and the mail deletion command is a DELE command of the POP3.

To accomplish the above and other objects of the present invention, a method is provided to selectively receive electronic mail from an incoming mail server, comprising: setting an access time to access the incoming mail server; determining whether a current time is equal to the access time; receiving mail header information of an electronic mail from the incoming mail server when the current time is equal to the access time; selecting a predetermined mail from the electronic mail; transmitting an RETR command to the incoming mail server; and receiving the predetermined mail from the incoming mail server corresponding to the RETR command.

According to an aspect of the invention, a method is provided to selectively receive electronic mail from an incoming mail server, comprising: setting an access time to access the incoming mail server; determining whether a current time is equal to the access time; receiving mail header information of an electronic mail from the incoming mail server when the current time is equal to the access time; selecting a predetermined mail from the electronic mail; transmitting a DELE command to the incoming mail server; and deleting the predetermined mail from the incoming mail server corresponding to the DELE command.

According to an aspect of the invention, a method is provided to selectively receive electronic mail from an incoming mail server, comprising: receiving mail header information of an electronic mail from the incoming mail server; selecting a predetermined mail from the electronic mail; transmitting an RETR command and a DELE command at a same time to the incoming mail server; receiving the predetermined mail from the incoming mail server corresponding to the RETR command; and deleting the predetermined mail from the incoming mail server corresponding to the DELE command.

These together with other objects and advantages, which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above objects and advantages of the present invention will become more apparent by describing in detail preferred embodiments thereof with reference to the attached drawings in which:

FIG. 2 is a flowchart of a method to selectively receive or delete mail according to an exemplary embodiment of the present invention.

DETAILED DESCRIPTION OF THE PREFERRED EMBODIMENTS

Figure 1:
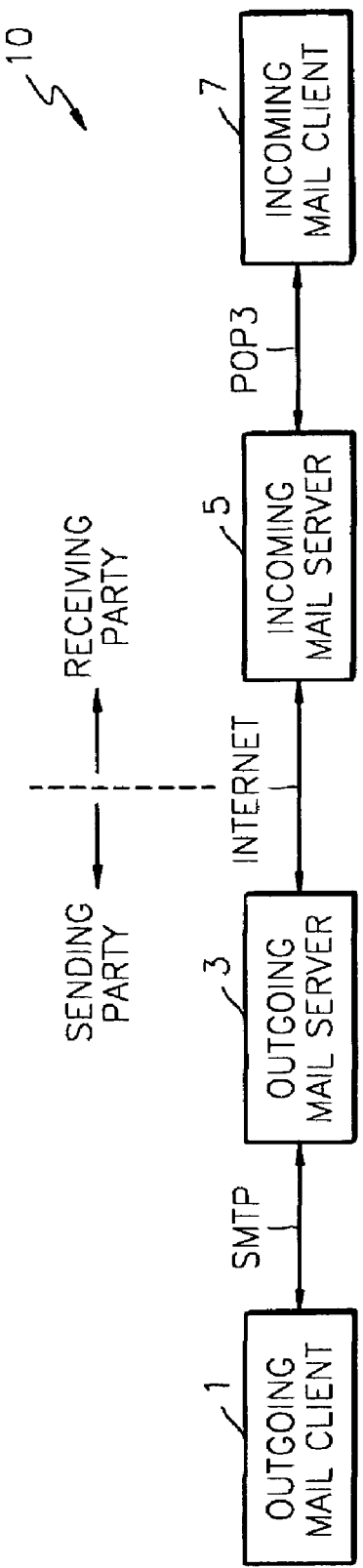
FIG. 1 is a block diagram of a general process of transmitting and receiving electronic mail.

Hereinafter, embodiments of the present invention will be described in detail with reference to the attached drawings. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

A method to selectively receive or delete electronic mail according to an exemplary embodiment of the present invention is shown in a flowchart in FIG. 2, and for convenience of explanation, an Internet mail apparatus using the POP3 is described as an example. However, the method to selectively receive or delete mail, according to the present invention, is not restricted to the Internet mail apparatus using the POP3.

The Internet mail apparatus according to the present invention includes an incoming mail client (or a client program to receive electronic mail). For convenience of explanation, hereinafter, the incoming mail client is referred to as the Internet mail apparatus according to the present invention.

Referring to FIG. 2, at operation 201, a user sets an access time interval so that the Internet mail apparatus can periodically access an incoming mail server after predetermined time intervals (for example, one hour). If the access time interval is set, at operation 203, the Internet mail apparatus waits for the access time to occur.

At operation 205, if the current time is not equal to the access time, the Internet mail apparatus returns to operation 203 and waits for the access time. If the current time is equal to the access time, at operation 207, the Internet mail apparatus accesses the incoming mail server.

At operation 209, a POP3 authentication is performed where, the Internet mail apparatus and the incoming mail server are linked, and the incoming mail server transmits a predetermined reply (for example, a reply including a greeting).

If the Internet mail apparatus transmits an APOP command to the incoming mail server, the incoming mail server transmits a number of electronic mails received to the Internet mail apparatus in response to the APOP command. Also, at operation 211, the Internet mail apparatus transmits a LIST command to the incoming mail server, and the incoming mail server transmits in order a size from each of the received electronic mails to the Internet mail apparatus in response to the LIST command.

Then, at operation 213, the Internet mail apparatus transmits a TOP command to the incoming mail server. At operation 215, the incoming mail server extracts mail header information of each electronic mail, and outputs the mail header information to the Internet mail apparatus. Here, the TOP command is an example of commands that request only mail header information.

The mail header information includes a sending person, a receiving person, date, or a subject. At operation 217, the Internet mail apparatus receiving the mail header information classifies the mail header information of each electronic mail and stores the information in a predetermined device, for example, in a memory.

When operations 201 through 215 are repeated, the memory of the Internet mail apparatus can sequentially store mail header information corresponding to each mail that the incoming mail server receives. At operation 219, if the user does not want to display mail header information of each mail, the Internet mail apparatus returns to operation 203. However, at operation 219, if the user wants to display the mail header information of each electronic mail, at operation 221, the Internet mail apparatus displays the mail header information of each electronic mail stored in the memory on a display apparatus (not shown).

At operation 223, if the user wants to retrieve each of the mail header information and receive a predetermined mail, and accordingly, the user selects (or checks) the predetermined mail which the user wants to receive, the Internet mail apparatus transmits an RETR command to the incoming mail server. In response to the RETR command, at operation 225, the incoming mail server transmits the predetermined mail to the Internet mail apparatus. Therefore, at operation 227 the Internet mail apparatus receives the predetermined mail corresponding to the RETR command. For example, RETR1 is a command requesting to send the mail in the first line.

However, when the user wants to retrieve each mail header information and delete a predetermined mail, at operation 233, the user selects (or checks) the predetermined mail which the user wants to delete. At operation 235, the Internet mail apparatus transmits a DELE command to the incoming mail server and, at operation 237, the incoming mail server deletes the predetermined mail corresponding to the DELE command. For example, DELE1 is a command requesting to delete the mail in the first line.

Also, if the user wants to receive the predetermined mail and then delete the predetermined mail, the user can select (or check) to receive and delete at a same time. When the user receives or deletes the predetermined mail and if the Internet mail apparatus transmits a QUIT command to the incoming mail sever, at operation 239, the incoming mail server disconnects a link to the Internet mail apparatus in response to the QUIT command.

If the incoming mail server receives the TOP command transmitted by the Internet mail apparatus, the incoming mail server transmits the mail header information of at least one mail to the Internet mail apparatus. Also, the incoming mail server transmits at least one mail corresponding to the RETR command to the Internet mail apparatus.

The TOP command of the POP3 is an example of the command requesting the mail header information from the Internet mail apparatus, and the command requesting the mail header information is not restricted to the TOP command of the POP3. The RETR command of the POP3 is an example of the command requesting to send the mail from the Internet mail apparatus, and the command requesting to send the mail is not restricted to the RETR command of the POP3. Also, if the incoming mail server receives the TOP command transmitted by the Internet mail apparatus, the incoming mail apparatus transmits the mail header information of the at least one mail to the Internet mail apparatus.

Also, the incoming mail server deletes at least one stored mail corresponding to the DELE command from the Internet mail apparatus. The DELE command of the POP3 is an example of the command to delete one of the electronic mails from the Internet mail apparatus. As described above, as the Internet mail apparatus, according to the present invention may store only the mail header information in the memory device, thus, a memory device having smaller capacity may be used, reducing a cost for the Internet mail apparatus.

Also, because the user may select mail header information and receive or delete electronic mails, a communications cost due to receiving unwanted spam mail may be reduced. As the user may select mail header information and receive or delete electronic mails, a printing cost may be reduced in the Internet mail apparatus having a printing function.

Although the preferred embodiment of the present invention has been described, it will be understood by those skilled in the art that the present invention should not be limited to the described preferred embodiment, but various changes and modifications can be made within the spirit and the scope of the present invention. Accordingly, the scope of the present invention is not limited within the described range but the following claims.

What is claimed is:

1. A method to selectively receive mail by an Internet mail apparatus, comprising:
    receiving and storing mail header information of at least one mail;
    selecting mail header information corresponding to a predetermined mail from the at least one mail;
    transmitting a mail transmission command requesting transmission of the predetermined mail corresponding to the mail header information selected; and
    receiving, at the Internet mail apparatus, the predetermined mail in response to the mail transmission command.

2. A method to selectively receive mail by an Internet mail apparatus from an incoming mail server, comprising:
    outputting a command requesting mail header information to the incoming mail server;
    receiving and storing mail header information of at least one mail transmitted from the incoming mail server in response to the command requesting the mail header information;
    selecting the mail header information of a predetermined mail from the at least one mail;
    transmitting a mail transmission command to the incoming mail server requesting transmission of the predetermined mail corresponding to the mail header information of the predetermined mail selected; and
    receiving the predetermined mail from the incoming mail server.

3. The method as recited in claim 2, wherein the command requesting mail header information is a TOP command of a Post Office Protocol 3 (POP3), and the mail transmission command is an RETR command of the POP3.

4. A mail transmission method by an Internet mail apparatus from an incoming mail server, comprising:
    receiving a command requesting mail header information from the Internet mail apparatus;
    transmitting mail header information of at least one mail to the Internet mail apparatus in response to the command; and
    transmitting the at least one mail corresponding to the command to the Internet mail apparatus.

5. The method as recited in claim 4, wherein the command requesting mail header information is a TOP command of a POP3, and the mail transmission command is an RETR command of the POP3.

6. A method to selectively delete a mail in an incoming mail server, comprising:
    receiving a command requesting mail header information from an Internet mail apparatus;
    transmitting mail header information of at least one mail to the Internet mail apparatus in response to the command; and
    deleting the at least one mail corresponding to the command to the Internet mail apparatus.

7. The method as recited in claim 6, wherein the command requesting mail header information is a TOP command of a POP3, and the mail deletion command is a DELE command of the POP3.

8. A method to selectively receive electronic mail from an incoming mail server, comprising:
    setting an access time to access the incoming mail server;
    determining whether a current time is equal to the access time;
    receiving mail header information of an electronic mail from the incoming mail server when the current time is equal to the access time;
    selecting a predetermined mail from the electronic mail;
    transmitting an RETR command to the incoming mail server; and
    receiving the predetermined mail from the incoming mail server corresponding to the RETR command.

9. The method as recited in claim 8, further comprising:
    transmitting an APOP command to the incoming mail server; and
    receiving a number of electronic mails from the incoming mail server in response to the APOP command.

10. The method as recited in claim 9, further comprising:
    transmitting a LIST command to the incoming mail server; and
    receiving in order a size of the electronic mails from the incoming mail server in response to the LIST command.

11. The method as recited in claim 8, further comprising:
    transmitting a QUIT command to the incoming mail sever to disconnect from the incoming mail server.

12. The method as recited in claim 8, wherein the mail header information comprises a sending person information, a receiving person information, a date, or a subject.

13. The method as recited in claim 8, further comprising:
    transmitting a DELE command to the incoming mail server; and
    deleting the predetermined mail from the incoming mail server corresponding to the DELE command.

14. The method as recited in claim 8, further comprising:
    displaying the mail header information of the electronic mail;
    classifying the mail header information of the electronic mail; and
    storing the mail header information in a memory device.

15. A method to selectively receive electronic mail from an incoming mail server, comprising:
    setting an access time to access the incoming mail server;
    determining whether a current time is equal to the access time;

receiving mail header information of an electronic mail from the incoming mail server when the current time is equal to the access time;
selecting a predetermined mail from the electronic mail;
transmitting a DELE command to the incoming mail server; and
deleting the predetermined mail from the incoming mail server corresponding to the DELE command.

16. The method as recited in claim 15, further comprising: transmitting a QUIT command to the incoming mail sever to disconnect from the incoming mail server.

17. The method as recited in claim 15, wherein the mail header information comprises a sending person information, a receiving person information, a date, or a subject.

18. A method to selectively receive electronic mail from an incoming mail server, comprising:
receiving mail header information of an electronic mail from the incoming mail server;
selecting a predetermined mail from the electronic mail;
transmitting an RETR command and a DELE command at a same time to the incoming mail server;
receiving the predetermined mail from the incoming mail server corresponding to the RETR command; and
deleting the predetermined mail from the incoming mail server corresponding to the DELE command.

* * * * *